United States Patent [19]

Luthi

[11] 3,837,499
[45]* Sept. 24, 1974

[54] DRUM STRUCTURE FOR ROTARY DRUM FILTERING APPARATUS

[75] Inventor: Oscar Luthi, Nashua, N.H.

[73] Assignee: Improved Machinery, Inc., Nashua, N.H.

[ * ] Notice: The portion of the term of this patent subsequent to Aug. 1, 1989, has been disclaimed.

[22] Filed: Mar. 29, 1971

[21] Appl. No.: 128,798

[52] U.S. Cl. .............................................. 210/404
[51] Int. Cl. ............................................ B01d 33/06
[58] Field of Search ........................... 210/399–407

[56] References Cited
UNITED STATES PATENTS

| | | | |
|---|---|---|---|
| 3,175,691 | 3/1965 | Watson | 210/404 |
| 3,386,584 | 6/1968 | Luthi | 210/404 |
| 3,680,708 | 8/1972 | Luthi | 210/404 |
| 3,724,507 | 11/1955 | Catatdo | 210/404 |

Primary Examiner—Theodore A. Granger
Attorney, Agent, or Firm—Robert R. Paquin

[57] ABSTRACT

A drum structure for rotary drum filtering apparatus, comprising a supporting drum carrying rib elements defining filtrate compartments which extend generally longitudinally along the drum circumference, and corrugated cover elements mounted to the rib elements by clips to form a cover circumferentially around the supporting drum over the filtrate compartments. Each groove of the corrugations in the outer surface of each cover element communicates with a therebelow filtrate compartment through a louvered opening arranged to discharge liquid in a direction generally towards the discharge end of the communicating filtrate compartment; and one side of each corrugated element is spaced from the thereadjacent portions of the drum structure to permit lateral expansion of the cover elements.

19 Claims, 8 Drawing Figures

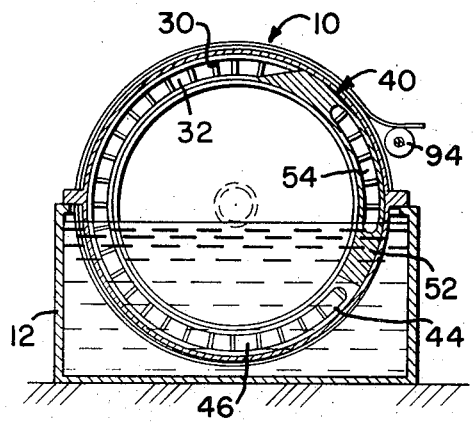
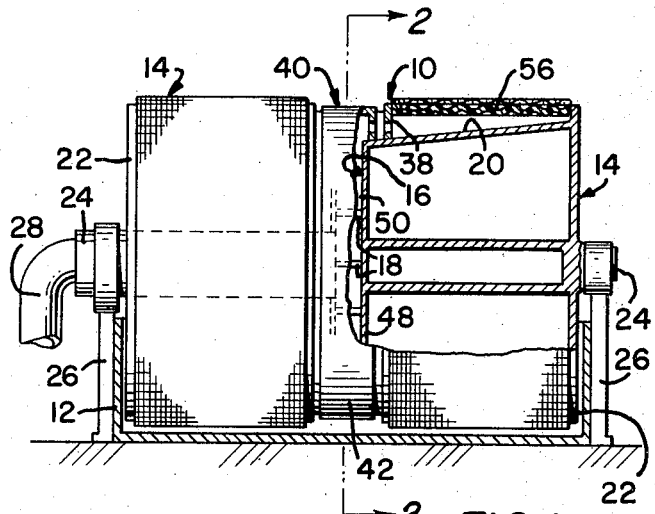
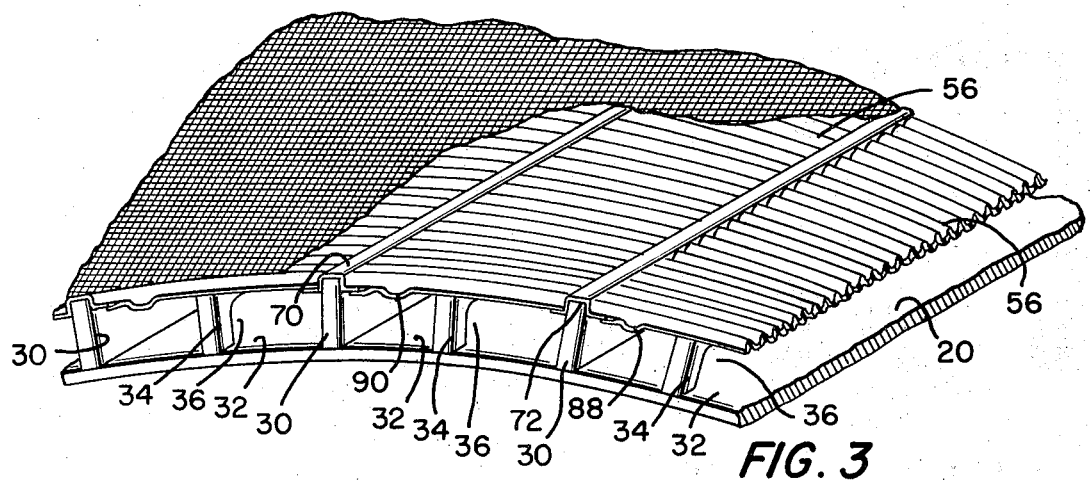
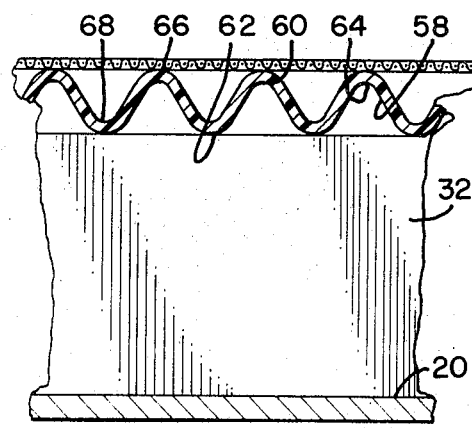
INVENTOR
OSCAR LUTHI
BY
Robert R. Paquin
ATTORNEY

INVENTOR
OSCAR LUTHI

ATTORNEY

DRUM STRUCTURE FOR ROTARY DRUM FILTERING APPARATUS

The present invention relates to rotary drum filtering apparatus and more particularly to the drum structure of rotary drum filtering apparatus such as, for example, rotary drum filters, thickeners, washers and the like of the type employed for filtering a slurry such as pulp stock.

Conventionally, rotary drum filtering apparatus of this general type has included a drum structure which supports a circumferential filter medium and contains filtrate compartments communicating with the openings in the filter medium for receiving liquid drained through the latter. For example, U.S. Pat. Nos. 3,306,460 and 3,363,774, assigned to the assignee of the present invention, both disclose filtering apparatus of this general type; and my co-pending U.S. Pat. application Ser. No. 71,073, filed Sept. 10, 1970 now U.S. Pat. No. 3,680,708, also assigned to the assignee of the present invention, discloses another filtering apparatus of this general type.

The drum structure of rotary drum filtering apparatus of this type must be capable of withstanding differential expansion of its component elements arising during the filtering operation due to the employment of dissimilar materials for the component elements and/or temperature variations between different portions of the filtering cycle. Otherwise, the differential expansion will cause failure of the connections of such component elements and/or possibly even result in their fracture. Also, in the event that a winding wire be required to support the filter medium, this differential expansion may result in slackening of the winding wire and resultant possible damage to the filter medium; and the inherent instability of the winding wire necessitates that it be wound at high tension, thereby requiring that the drum structure be of great strength to withstand the compressive load of the winding wire.

An object of the present invention is to provide a new and improved drum structure for rotary drum filtering apparatus, which is particularly constructed and arranged to permit expansion of its component elements without resultant damage.

Another object of the invention is to provide a new and improved drum structure for drum filtering apparatus, which is particularly constructed and arranged to allow ready and simple replacement of relatively small portions thereof.

Another object is to provide a new and improved drum structure for rotary drum filtering apparatus, which is particularly constructed and arranged to be of both of relative light weight and strong enduring construction.

Another object is to provide a new and improved drum structure for rotary drum filtering apparatus, which is particularly constructed and arranged to permit mass production of its component elements with minimal employment of special equipment for their manufacture.

Another object is to provide a new and improved drum structure for rotary drum filtering apparatus, which is particularly constructed and arranged to be highly efficient in operation and relatively simple and economical in construction.

In accordance with the present invention a drum structure for rotary drum filtering apparatus may comprise a generally annular supporting drum, division means carried by the supporting drum defining a plurality of filtrate compartments extending along the circumference of the drum, a corrugated cover carried by the supporting drum spaced from the circumference of the drum by the filtrate compartments, the corrugated cover having a surface facing away from the filtrate compartments and the corrugations of the cover including alternate ridges and grooves in such surface of the cover, and the corrguated cover including louvered openings therethrough communicating with the filtrate compartments for draining liquid thereto.

REFERRING TO THE DRAWINGS

FIG. 1 is an elevational view, partially broken away and in section, of a rotary drum filtering apparatus provided with a drum structure constructed in accordance with one embodiment of the invention;

FIG. 2 is an elevational sectional view of the rotary drum filtering apparatus shown in FIG. 1, taken on line 2—2 of FIG. 1 looking in the direction of the arrows;

FIG. 3 is an enlarged, fragmentary perspective view showing a portion of the drum structure of the rotary drum filtering apparatus of FIGS. 1 and 2;

FIG. 4 is a further enlarged, fragmentary sectional view of such drum structure looking in the circumferential direction of the drum;

Figure 6:
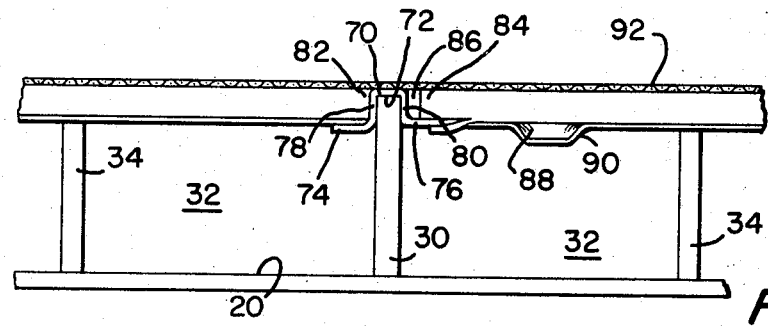
FIG. 6 is an enlarged, fragmentary elevational sectional view of the drum structure looking in the axial direction of the drum.

Referring more particularly to the drawings wherein similar reference characters designate corresponding parts throughout the several views, the rotary drum filtering apparatus illustrated in FIG. 1 comprises a drum structure, designated generally as 10, partially submerged in a vat or tank 12 which contains a pulp stock or other slurry to be filtered. The drum structure 10 comprises a generally annular, rotatably driven drum constructed to include two identical, co-axial, annular drum halves 14 spaced one from another by an annular space or channel 16 adjacent the longitudinal midpoint of the drum. The drum halves 14 are connected to one another by suitable conventional bracing elements, including the tie elements 18, to be conjointly rotatable. The drum halves 14, as illustrated, both may be constructed such that the outer circumferences 20 slope downwardly towards the space or channel 16. The opposite ends of the drum structure are closed by end closure plates 22 which are connected to trunnions 24 rotatably mounting the drum structure on bearing pedestals 26. One of the trunnions 24 is hollow and communicates with the upper end of a vacuum pipe or barometric leg 28 which, during the operation of the filtering apparatus, serves in the conventional manner to drain filtrate and create and apply a sub-atmospheric pressure or vacuum. As will be understood, the illustrated drum structure divided into halves has been shown for the purposes of illustration only; and the present invention is not limited to drum structures divided into halves or other sections but rather is equally applicable to drums which are undivided in which event the entire drum structure could, by way of example, be constructed similarly to a single one of the illustrated drum halves 14.

A plurality of imperforate upstanding rib or division elements 30 are rigidly mounted on the outer circumference 20 of each drum half 14 circumferentially spaced around the drum half 14 to cause circumferentially adjacent ones of the elements 30 of each drum half 14 to form opposing side walls of circumferential filtrate compartments 32. The rib elements 30 extend generally longitudinally along their respective outer drum circumferences 20 substantially throughout the length of their respective drum half 14; thus, the filtrate compartments 32 of each drum half 14 extend generally longitudinally along the outer circumference 20 of the latter substantially throughout its extent. The filtrate compartments 32 of each drum half 14 have juxtaposed open discharge ends provided with drainage openings 38 communicating with the annular space 16 between the drum halves 14, but are closed at the outer ends of the drum by an end closure plate 22 and closed along their inner periphery by the outer circumference 20 of their respective drum half 14.

As illustrated, a single supporting rib element 34 is affixed to each outer circumference 20 intermediate each two circumferentially adjacent rib elements 30, the supporting rib elements 34 extending generally longitudinally along the outer circumferences 20 and having openings 36 therethrough communicating the portions of the filtrate compartments 32 on opposite sides thereof. alternatively, however, more than one supporting rib element 34 could be provided between each two of the circumferentially adjacent ones of the rib elements 30; and, in those embodiments of the drum structure in which a support between the rib elements 30 is not necessary the supporting rib elements 34 could be omitted. Also, if desired, the ribs 30, 34 could be molded integral with the drum halves 14 in the event that the latter are of molded plastic construction.

A stationary or non-rotatable valving assembly, designated generally as 40, is mounted in the space 16 between the drum halves 14. The valving assembly 40, per se, is of conventional construction and is constructed to permit the application of sub-atmospheric pressure or vacuum to the filtrate compartments 32 through the openings 38 during the major portion of the drum rotation, but prevents such application of sub-atmospheric pressure from about the one o'clock position (as viewed in FIG. 2) through about the four o'clock position (as viewed in FIG. 2). The valving assembly 40 may be held against rotation either by means externally of the drum structure 10 or alternatively in any other conventional manner such as by means internally of the drum structure 10. Also, alternatively to the illustrated valving assembly 40, the filtering apparatus could, if desired, be provided with a valve located at one end of the drum and connected to the compartment ends 38 by a plurality of separate pipes, an example of this latter form of valving being described in my U.S. Pat. No. 3,363,744, issued Jan. 16, 1968, and assigned to the assignee of the present invention.

The valving assembly 40 comprises an arcuate outer wall 42 surrounding the drum structure 10 and throughout the approximately 270° arc between about the four o'clock position of FIG. 2 and about the one o'clock position of FIG. 2 has integral side walls 44 provided with openings 46 which communicate with the filtrate compartment open ends 38 of each drum half 14. The inner periphery of the valving assembly 40 is open throughout such approximately 270° arc; and the drum structure 10 is provided with spaced discs, one of which is shown as 48, bounding the opposite sides of a fluid passage 50 communicating with the open inner periphery of the valving assembly 40 throughout this 270° arcuate length. The fluid passage 50, in turn, is connected through the channel in the hollow trunnion 24 to the barometric leg 28 whereby the barometric leg 28 communicates through the valving assembly 40 with the filtrate compartment open ends 38 throughout such 270 degree arcuate length of the valving assembly 40.

The valving assembly 40 from the aforesaid about one o'clock position through the aforesaid about four o'clock position is closed along its inner periphery by an arcuate wall which prevents communication of the filtrate compartments 32 with the barometric leg 28. Also, this latter length of the valving assembly 40 is closed at its opposite ends by transversely extending end closure walls (not shown) and along its opposite sides has side walls 52, one of which is shown in FIG. 2. The side walls 52 are each provided with an elongated opening 54 therethrough; and the outer wall 42 is in the usual manner provided with openings (not shown) permitting air from the initially submerging filtrate compartments 32 to escape to the atmosphere through the elongated openings 54 and such openings in the wall 42. Further details of the construction of the illustrated valving assembly 40, if desired, may be obtained from U.S. Pat. No. 3,306,460, it being understood that such valving assembly has been shown for the purposes of illustration only and the drum structure of the invention is not limited to application with this valving assembly.

In accordance with the present invention, the drum structure 10 includes a corrugated cover mounted circumferentially over the filtrate compartments 32 of each drum half 14. The corrugated cover of each drum half 14 is formed by a plurality of separate corrugated cover elements or plates 56, each longitudinally the length of one of the filtrate compartments 32 and transversely or circumferentially a width slightly less than one of the filtrate compartments 32, which are mounted along opposite side edges to circumferentially adjacent ones of the rib elements 30. The corrugated cover plates each include an inner face or surface 58 bounding the circumferentially outer side of a respective filtrate compartment 32 and an outer face or surface 60 facing away from such filtrate compartment 32; and the circumferentially adjacent ones of the cover elements 56 of each drum half 14 are circumferentially spaced one from the other by an intermediate rib element 30. The inner face 58 of each cover element 56 is supported on, but preferably not rigidly affixed to, the intermediate rib 34 in the overload filtrate compartment.

The corrugations of the cover elements 56 extend circumferentially of the drum halves 14 to provide the inner face of each cover element 56 with substantially parallel, alternate, transverse ridges 62 and grooves 64 while providing the outer face 60 of each cover element 56 with similar generally parallel, alternate, transverse ridges 66 and grooves 68. The grooves 64, 68 and ridges 62, 66 extend the full width of the cover elements 56. The formation of the corrugations transversely of the cover elements 56, as will be seen, provides the cover elements 56 with substantial inherent flexibility in the longitudinal direction of the drum sections 14.

As illustrated in FIGS. 3 and 6, the cover elements 56 are supported in their positions overlaying the filtrate compartments 32 on the rib elements 30 by a mounting means comprising a generally "U" shaped mounting clip 70 on each of the rib elements 30. The mounting clips 70, inverted to snuggly receive the upper sides of the rib elements 30 in their recesses 72, extend throughout the lengths of the rib elements 30 and throughout their lengths have integral supporting portions 74, 76 extending outwardly from the opposite side walls 78, 80 bounding the recesses 72. The mounting clips 70 of the drum structure 10 are individual elements formed separately of the cover elements 56.

One edge 82 of each cover element 56 is welded or otherwise rigidly affixed to the side wall 78 and supporting portion 74 of the thereadjacent mounting clip in abutting relationship with the side wall 78 to prevent liquid flow between the edge 82 and the thereadjacent element 30. The opposite edge 84 of each cover element 56 is illustrated as supported by the supporting portion 76 of the thereadjacent mounting clip 70 in interlocking relationship with the latter. The edge 84 of the cover element 56, as shown in FIG. 6, is throughout its length spaced from the side wall 80 (and hence from the thereadjacent rib element 30) by a gap or clearance 86, thereby permitting lateral expansion of the cover element 56. It will be understood that the illustrated interlocking arrangement of the edges 84 and mounting clips 70 has been shown for the purposes of illustration only; and the edges 84 alternatively may be otherwise suitably secured in a manner permitting lateral expansion of the cover elements 56, such as for example by the employment of capping elements overlying the ends 84 and the clips 70. In the embodiment of the invention illustrated in FIGS. 1 through 6 wherein the drum structure 10 is intended to be rotatably driven in the clockwise direction (as viewed in FIG. 2), the edges 82 of the cover element 56 affixed to the side walls 78 and supporting portions 74 are the leading edges of the cover element 56 in the direction of the drum driven rotation; and the other edges 84 are the trailing edges of the cover element 56. However, it will be understood that alternatively the trailing edges 84 could be rigidly affixed to the side walls 78 and supporting portions 76 in which event the leading edges 82 would be spaced from the side walls 78 by gaps or clearances similar to those shown as 86.

Figure 5:
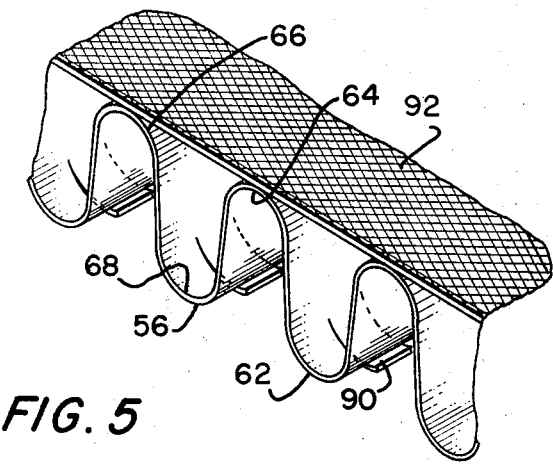
FIG. 5 is a fragmentary perspective view of such drum structure showing the louvered openings for draining liquid to the filtrate compartments.

Each groove 68 in each cover element 56 is provided with a louvered opening 88 communicating the groove 68 with the therebelow filtrate compartment 32 for draining liquid from the former to the latter. The louvered openings 88, as best shown in FIG. 5, are adjacent the bottoms of the grooves 68; and the louvers 90 for the openings 88 are arranged to direct the liquid flowing from the grooves 68 through the openings 88 to the filtrate compartments 32 in a direction towards the ends of the filtrate compartments 32 having the openings 38. Although only a single louvered opening 88 located adjacent the edge 84 of the cover element 56 is shown in communication with each groove 68 in the illustrated embodiments of the invention, it will be understood that, if desired or required, additional louvered openings 88 could be provided for each of the grooves 68.

The usual wire filter medium 92 is affixed around each drum half 14 and supported on the peaks of the ridges 66 of the outer surface 60 of the cover elements 56 and the mounting clips 70.

In the operation of the filtering apparatus, the drum structure 10 is rotatably driven in the clockwise direction (as viewed in FIG. 2) to successively drive the filtrate compartments 32 below the level of the slurry in the vat 12 for solid material accretion on the filter medium 92 and then above such level for drying of accumulated solid material and removal of such material by doctor means (not shown) generally at the location of the roller 94. During the initial submergence of the filtrate compartments 32 into the slurry, solid material accretion is effected without the assistance of the subatmospheric pressure, but air in the initially submerging filtrate compartments 32 is allowed to escape to the atmosphere. Below the lower most ends of the walls 52, sub-atmospheric pressure is applied to the filtrate compartments 32 through their open ends 38 and additional solid material is resultantly collected on the filter medium 92. The sub-atmospheric pressure continues to be applied to the compartments 32 as the latter are rotated above the level of the slurry and the accumulated solid material is being dried. The sub-atmospheric pressure is cut-off from the filtrate compartments 32 as they are rotated to the upper end of the walls 50 where the dried collected solid material is removed from the filter medium 92 preparatory to the commencement of another filter cycle.

The liquid drained through the openings in the filter medium 92 passes into the grooves 68 in the outer surfaces 60 of the cover elements 56 and flows in such grooves 68 circumferentially of the drum structure 10 to the louvered openings 88 which discharge the liquid to the therebelow filtrate compartments 32 in a direction generally towards the openings 38 at the discharge ends of the filtrate compartments 32.

Expansion of the cover elements 56 in the longitudinal direction of the drum structure 10 is, of course, accommodated due to the inherent flexibility of the cover elements 56 in the longitudinal direction of the drum. Expansion of the cover elements 56 in the circumferential direction of the drum is permitted due to the gaps 86 and the ability of the cover elements 56 to laterally move or expand relative to the rib elements 34. Also, in the event that one or more of the cover elements 56 requires replacement due to localized damage, corrosion or other reasons, ready and simple replacement of such cover elements 56 is possible without removal or replacement of the other cover elements 56. In addition, as will be seen, the cover elements 56 are readily capable of mass production on relatively small, inexpensive, high speed machinery and do not require special equipment for their manufacture and/or installation.

Figure 7:
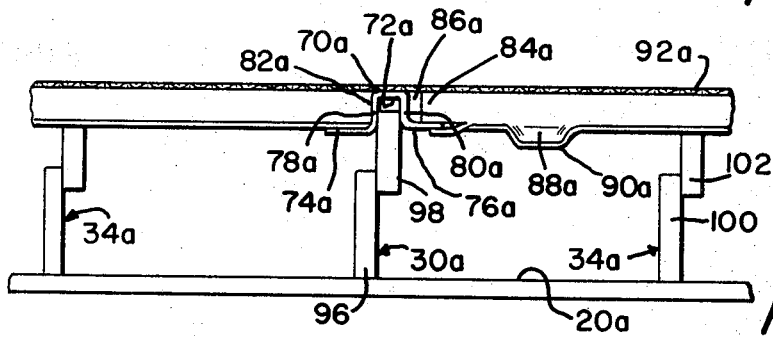
FIGS. 7 and 8 are views generally similar to FIG. 6, but illustrating two modified embodiments of the drum structure.

FIG. 7, wherein parts corresponding to those of the aforedescribed drum structure 10 are designated by the reference character for the aforedescribed similar part followed by the suffix *a*, fragmentarily illustrates a drum structure 10*a* identical that aforedescribed except only that the rib elements 30*a*, 34*a* are adjustable. More particularly, in the FIG. 7 embodiment of the invention the rib elements 30*a*, 34*a* are formed of two piece construction and include portions 96, 98 and 100, 102, respectively, connectable in a plurality of alternatively adjusted positions.

Figure 8:
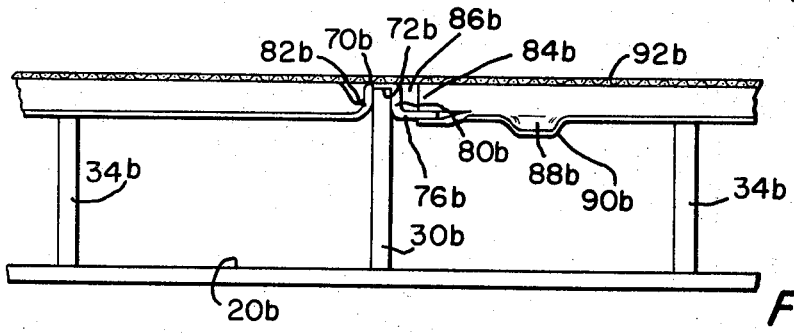

FIG. 8, wherein parts corresponding to those of the aforedescribed drum structure 10 are designated by the reference character for the aforedescribed similar part followed by the suffix b, fragmentarily illustrates another modified drum structure 10b which differs from the drum structure 10 only in that the mounting clips 70b are formed integral with the edges 82b of the cover elements 56b.

Although only three embodiments of the invention have been illustrated and hereinbefore specifically described, it will be understood that the invention is not limited merely to these three embodiments, but rather contemplates other embodiments and variations within the scope of the following claims.

Having thus described my invention, I claim:

1. A drum structure for rotary drum filtering apparatus, comprising a generally annular supporting drum, division means carried by said supporting drum defining a plurality of filtrate compartments extending along the circumference of said drum, a corrugated cover carried by said supporting drum spaced from the circumference of said drum by said filtrate compartments, said corrugated cover having a surface facing away from said filtrate compartments and the corrugations of said cover including alternate ridges and grooves in said surface of said cover, and said corrugated cover including louvered openings therethrough communicating with said filtrate compartments for draining liquid thereto.

2. A drum structure according to claim 1, wherein said corrugated cover comprises a plurality of corrugated cover elements spaced from adjacent portions of the drum structure to permit their expansion.

3. A drum structure according to claim 1, wherein said corrugated cover comprises a plurality of corrugated cover elements each extending along only a portion of the circumference of said supporting drum, each said corrugated cover element having its ridges and grooves axially extending transversely to an edge thereof and each of said cover elements having its said edge spaced from thereadjacent portions of the drum structure to permit expansion of said cover elements.

4. A drum structure according to claim 1, wherein said louvered openings are intermediate the peaks of adjacent ones of said ridges, and the louvers for said louvered openings are all arranged to direct the liquid in the same direction.

5. A drum structure according to claim 1, wherein said louvered openings are adjacent the bottoms of said grooves, said filtrate compartments have juxtaposed discharge ends, and the louvers for said openings are arranged to direct liquid flowing through said openings towards the discharge ends of the communicating filtrate compartments.

6. A drum structure for rotary drum filtering apparatus, comprising a generally annular supporting drum, rib means carried by said supporting drum defining a plurality of filtrate compartments extending along the circumference of said drum, a plurality of corrugated cover plates extending around said supporting drum spaced outwardly from said supporting drum by said filtrate compartments, said cover plates having inner surfaces facing towards said filtrate compartments and outer surfaces facing away from said filtrate compartments, the corrugations of said cover plate providing each said surface of each said cover plate with alternate ridges and grooves extending transversely to said filtrate compartments, and mounting means supporting opposite edges of said cover plates on said rib means with one of said edges of each said cover plate spaced from its supporting rib means, said cover including louvered openings therethrough communicating said grooves in their said outer surfaces with said filtrate compartments, and the louvers for said openings being arranged to direct filtrate towards the corresponding ends of said filtrate compartments.

7. A drum structure according to claim 6, wherein said louvered openings are adjacent the bottoms of the grooves in said outer surfaces of said cover elements.

8. A drum structure according to claim 6, wherein each said groove in said outer surfaces is provided with a single one of said louvered openings.

9. A drum structure according to claim 6, wherein said mounting means comprises clip means mounted on said rib means.

10. a drum structure according to claim 6, wherein adjacent edges of circumferentially adjacent cover plates are on opposite sides of a therebetween said rib means.

11. A drum structure for rotary drum filtering apparatus, comprising a generally annular supporting drum, a plurality of rib elements carried by said supporting drum longitudinally extending along the circumference of said drum generally in the longitudinal direction of said drum, said rib elements being circumferentially spaced around said drum to define a plurality of filtrate compartments which longitudinally extend along the circumference of said drum generally in the longitudinal direction of said drum, said filtrate compartments having juxtaposed drainage openings through which liquid is drained from the filtrate compartments, a plurality of corrugated cover plates each extending around only a portion of said supporting drum spaced outwardly from said supporting drum by said filtrate compartments, said corrugated cover plates having inner surfaces facing towards said filtrate compartments and outer surfaces facing away from said filtrate compartments and the corrugations of each said cover plate defining in each said surface alternate ridges and grooves extending circumferentially around said supporting drum, mounting means supporting opposite edges of said cover plates on said rib elements with one of said edges of each said cover plate spaced from its supporting rib element, said cover plates adjacent the bottoms of said grooves in said outer surfaces including louvered openings therethrough communicating with said filtrate compartments, and the louvers for said openings being integral with said cover plates and directing fluid flowing therethrough in a direction towards said drainage openings for said filtrate compartments.

12. A drum structure according to claim 11, wherein a single louvered opening connects each of said grooves in said outer surfaces of said cover plates with said filtrate compartments.

13. A drum structure according to claim 11, further comprising supporting elements carried by said supporting drum longitudinally extending along the circumference of said drum generally in the longitudinal direction of the latter intermediate said rib elements, said supporting elements supporting said cover plates intermediate their said edges and said cover plates being laterally movable relative to said supporting elements.

14. A drum structure according to claim 11, wherein adjacent edges of circumferentially adjacent cover plates are on opposite sides of a therebetween said rib element.

15. A drum structure according to claim 11, wherein said mounting means comprises clip means mounting adjacent edges of circumferentially adjacent cover plates to said rib elements.

16. A drum structure according to claim 15, wherein said clip means are generally "U" shaped.

17. A drum structure according to claim 15, wherein said clip means is integral with one of said edges of each said cover plate.

18. A drum structure according to claim 11, wherein said grooves and ridges extend throughout the cover plates in the circumferential direction of said supporting drum.

19. A drum structure according to claim 11, further comprising at least one supporting rib element carried by said supporting drum intermediate each of the circumferentially adjacent said rib elements, said supporting rib elements supporting said cover plates intermediate their said edges and said cover plates being laterally movable relative to said supporting ribs, and adjacent edges of circumferentially adjacent cover plates being on opposite sides of a therebetween said rib element and supported by a mounting means comprising the same clip.

* * * * *